United States Patent
Gao et al.

(10) Patent No.: US 10,207,954 B2
(45) Date of Patent: Feb. 19, 2019

(54) SYNTHETIC AGGREGATE FROM WASTE MATERIALS

(71) Applicant: Nano and Advanced Materials Institute Limited, Hong Kong (HK)

(72) Inventors: Yan Gao, Hong Kong (HK); Honggang Zhu, Hong Kong (HK); Yifei Yan, Hong Kong (HK); Bo Li, Ningbo (CN); Man Lung Sham, Hong Kong (HK); Tung-Chai Ling, Hunan (CN)

(73) Assignee: Nano and Advanced Materials Institute Limited, Hong Kong (HK)

( * ) Notice: Subject to any disclaimer, the term of this patent is extended or adjusted under 35 U.S.C. 154(b) by 57 days.

(21) Appl. No.: 15/389,357

(22) Filed: Dec. 22, 2016

(65) Prior Publication Data

US 2018/0179107 A1 Jun. 28, 2018

(51) Int. Cl.
| C04B 18/10 | (2006.01) |
| C04B 18/14 | (2006.01) |
| C04B 18/16 | (2006.01) |
| C04B 28/04 | (2006.01) |

(52) U.S. Cl.
CPC .......... C04B 18/167 (2013.01); C04B 18/103 (2013.01); C04B 18/141 (2013.01); C04B 28/04 (2013.01)

(58) Field of Classification Search
CPC ... C04B 18/167; C04B 18/103; C04B 18/141; C04B 28/04
See application file for complete search history.

(56) References Cited

U.S. PATENT DOCUMENTS

| 3,702,257 | A |   | 11/1972 | Koning |               |
|-----------|---|---|---------|--------|---------------|
| 3,961,973 | A |   | 6/1976  | Jones  |               |
| 4,624,711 | A | * | 11/1986 | Styron | C04B 18/027   |
|           |   |   |         |        | 106/122       |
| 4,741,782 | A | * | 5/1988  | Styron | C04B 18/027   |
|           |   |   |         |        | 106/122       |
| 5,057,009 | A | * | 10/1991 | Nechvatal | C04B 18/027 |
|           |   |   |         |        | 110/165 A     |
| 5,268,131 | A |   | 12/1993 | Harrison |             |
| 5,342,442 | A |   | 8/1994  | Nechvatal et al. |   |
| 5,562,767 | A |   | 10/1996 | Miller et al. |      |
| 5,711,768 | A | * | 1/1998  | Schulz | C02F 11/12    |
|           |   |   |         |        | 44/552        |
| 5,797,972 | A | * | 8/1998  | Schulz | C02F 11/12    |
|           |   |   |         |        | 44/532        |
| 5,997,629 | A |   | 12/1999 | Hills  |               |
| 6,183,242 | B1 |  | 2/2001  | Heian  |               |
| 6,416,691 | B1 | * | 7/2002 | Pildysh | B09B 3/0025  |
|           |    |   |        |         | 264/109      |
| 6,686,409 | B2 |   | 2/2004 | Mahmud et al. |      |
| 6,808,562 | B2 | * | 10/2004 | Bland | C04B 18/021  |
|           |    |   |         |       | 106/705      |
| 7,141,112 | B2 | * | 11/2006 | Comrie | C04B 28/006 |
|           |    |   |         |        | 106/697     |
| 7,294,193 | B2 | * | 11/2007 | Comrie | C04B 28/006 |
|           |    |   |         |        | 106/697     |
| 7,537,655 | B2 | * | 5/2009  | Abbate | C04B 18/027 |
|           |    |   |         |        | 106/713     |
| 7,655,088 | B2 | * | 2/2010  | Bethani | C04B 18/023 |
|           |    |   |         |         | 106/705     |
| 7,704,317 | B2 | * | 4/2010  | Bethani | C04B 18/023 |
|           |    |   |         |         | 106/705     |
| 7,780,781 | B2 | * | 8/2010  | Bethani | C04B 18/023 |
|           |    |   |         |         | 106/705     |
| 8,206,503 | B2 |   | 6/2012  | Wang   |              |
| 8,206,504 | B2 |   | 6/2012  | Bethani |             |
| 8,298,332 | B2 |   | 10/2012 | Dubey  |              |
| 9,340,456 | B2 | * | 5/2016  | Al-Bahar | C04B 14/10 |
| 2003/0159624 | A1 | * | 8/2003 | Kinuthia | C04B 18/101 |
|           |    |   |         |          | 106/707    |
| 2009/0081462 | A1 |  | 3/2009 | Miyoshi et al. |     |
| 2009/0104349 | A1 |  | 4/2009 | Hills et al. |       |
| 2012/0285082 | A1 |  | 11/2012 | Mcgoldrick |      |
| 2014/0338571 | A1 |  | 11/2014 | Evans |             |
| 2016/0052823 | A1 |  | 2/2016  | Al-Bahar et al. |  |

FOREIGN PATENT DOCUMENTS

| JP | 64027695 A | * | 1/1989 |
| JP | 04219185 A | * | 8/1992 |

* cited by examiner

*Primary Examiner* — Anthony J Green
(74) *Attorney, Agent, or Firm* — Idea Intellectual Limited; Margaret A. Burke; Sam T. Yip

(57) ABSTRACT

Synthetic aggregates are fabricated from greater than approximately 70 wt % waste starting materials. Starting materials may be selected from granulated ground blast furnace slag, waste concrete fines, or sewage sludge ash, and mixtures thereof. The starting materials are bound together by a hydraulic cementitious binder either added to the starting materials or formed in situ. The waste starting materials, binder, and water are formed into pellets and subjected to a hydraulic reaction and carbonation in an atmosphere of greater than approximately 50% carbon dioxide at temperatures less than approximately 100° C. The resulting synthetic aggregate has a crush strength after a period of hardening equal to or greater than approximately 0.5 MPa.

19 Claims, 3 Drawing Sheets

| | Undivided | Divided |
|---|---|---|
| GGBS |  |  |
| SSA |  |  |

SYNTHETIC AGGREGATE FROM WASTE MATERIALS

FIELD OF THE INVENTION

The field of the invention relates to construction aggregates and, more particularly, to synthetic construction aggregates from waste materials made without the need for high-temperature firing or sintering.

BACKGROUND

Aggregate is a particulate material used in the construction industry in a wide variety of applications including foundation bases, road bases, drainage culverts, railroad beds, and concrete filler. According to their density, aggregates may be categorized as "normal-weight aggregate" (e.g. granite, basalt, etc.), and "lightweight aggregate" (e.g. pumice, volcanic cinders, etc.). Typically, normal weight aggregate is obtained from mining combined with a crushing operation to produce particulates of a desired size. However, mining operations can disrupt the local environment and mines are often located far from population centers that require large quantities of aggregate.

With increasing concern over the excessive exploitation of natural aggregates, synthetic aggregate, including also both normal-weight and lightweight aggregate, has been explored as a new source of aggregate material. Some synthetic aggregates are classified as lightweight aggregates with a loose bulk density lower than 1200 kg/m$^3$. Lightweight aggregates are particularly attractive for the production of lightweight blocks and other lightweight construction products. The additional benefits of these products are their superior thermal and acoustic insulation performance.

Synthetic lightweight aggregates are now mainly manufactured by sintering expanding clays, shale, etc. The general steps of producing sintered lightweight aggregates are mixing of raw materials such as clays with water and additives to allow a formation of desired spherical pellet sizes through an agglomeration process. The spherical pellets are then fed directly into a rotary kiln (or sinter strand) at temperatures in the range of 1100-1200° C. Lightweight solid pellets are then produced by particle fusion and structure bloating. However, this energy intensive process and accompanying emission of greenhouses gases resulting from the burning of fuel to run a kiln raises environmental concerns. It is estimated that about 0.3 ton of $CO_2$ is produced for manufacturing one ton of lightweight aggregate.

At the same time that large population centers have a need for construction aggregate, these same population centers produce large quantities of waste that are currently disposed of in costly landfills. Such waste includes sewage sludge ash produced from incineration of sewage and construction waste including demolished concrete. Through a series of recycling processes, demolished concrete may be turned into recycled aggregates of different sizes for use in civil engineering applications. However, during the recycling processes, a significant amount of unusable concrete fines (20% or more) are produced, and this fraction of concrete fines is prohibited for use in concrete, thus finding a way to utilize it has become a priority in managing construction and demolition waste.

There is a need in the art for synthetic aggregate material produced from recycled waste products, particularly in large urban locations that are both sources of waste and consumers of aggregate.

DETAILED DESCRIPTION

Starting Waste Materials

Figure 1:
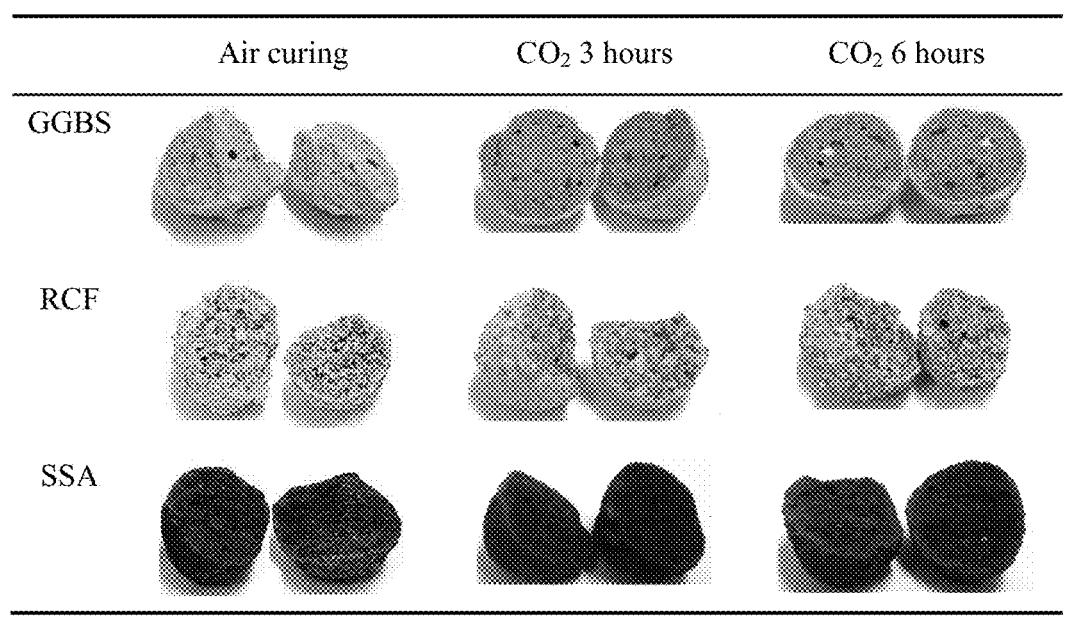
FIG. 1 shows photographs of divided synthetic aggregates from granulated ground blast furnace slag, recycled concrete waste fines and sewage sludge ash with ordinary Portland cement (25%) as the binder. Post-pelletization carbonation was performed for various time periods.

In the synthetic aggregates produced herein, three classes of starting waste materials may be used. The first type is granulated ground blast furnace slag. Slag is the material left over when a metal has been separated (e.g., smelted) from its respective metal ore. Granulated blast furnace slag is produced by quenching of molten iron slag (a by-product of iron and steel-making) from a blast furnace followed by grinding. The main components of granulated ground blast furnace slag are CaO (30-50%), $SiO_2$ (28-38%), $Al_2O_3$ (8-24%), and MgO (1-18%). All percentages set forth in the description are weight percentages unless otherwise indicated. A particular example composition of granulated ground blast furnace slag was used in the working examples and is set forth below.

A second type of waste material is recycled concrete waste fines. Concrete from demolished buildings, roads, bridges and other civil engineering applications may be recycled. The term "recycled concrete aggregate" refers to this recycled product. The recycled concrete aggregate may be used in a variety of civil engineering applications involving drainage and as base materials for foundations, roads, and rail beds. Sufficiently pure recycled aggregate may also be used to replace some or all of the aggregate in new concrete. However, approximately 20% of waste concrete forms recycled concrete waste fines that may not be used in new concrete without further processing of some kind. These recycled concrete waste fines are the second class of starting materials for the synthetic aggregates. The main components of recycled concrete waste fines are CaO and $SiO_2$ with lesser amounts of $Al_2O_3$. These main components are present in amounts from about 30-50% CaO, 40-60% $SiO_2$ and 5 to 15% $Al_2O_3$. A particular example composition of recycled concrete waste fines was used in the working examples and is set forth below.

A third type of starting waste material is sewage sludge ash. A by-product of municipal wastewater treatment, sewage sludge is typically the residual material left over and forms a semi-solid composition with a high water content. Incineration of sewage sludge may reduce the volume by up to 90%, but the amount of combustion residues, termed sewage sludge ash, is still large. Sewage sludge ash has low reactivity and heavy metal contaminants. The main components of sewage sludge ash are typically $SiO_2$, $Fe_2O_3$, CaO, $P_2O_5$, and $Al_2O_3$ in amounts of approximately 20-30% $SiO_2$, 15-25% $Fe_2O_3$, 5-25% CaO, 10-15% $P_2O_5$, and 5-15% $Al_2O_3$. A particular example composition of sewage sludge ash was used in the working examples and is set forth below.

Note that all of the starting materials necessarily have variable compositions because they are waste materials and, as such, come from a wide variety of sources. Therefore the above compositions are merely exemplary of starting material compositions. The amounts of the starting materials may range from approximately 70% to up to approximately 100% of the cured aggregate (that is, after drying and hardening). Exemplary amounts of the starting materials are approximately greater than 70%, approximately greater than 75%, approximately greater than 80% and approximately greater than 90% starting materials. The balance of the composition may be binder materials and optional additives as set forth below.

Binder Materials

In order to form the synthetic aggregates of the present invention, binders may be used. Binders are materials that harden independently of the starting materials and, as such, can cohesively retain starting material grains together to create a synthetic aggregate particle. Hydraulic binders are used in the synthetic aggregates of the present invention. The expression "hydraulic binder" as used herein relates to substances that chemically react with water. The expression "hydraulic binder" generally is used in connection with cements and cementitious materials. In a cement-based hydraulic reaction, setting and hardening occurs over an extended period of time, typically hours for setting and days for complete hardening, depending on the selected compositions. By approximately 7 days, the strength of the synthetic aggregates set forth in the working examples below has been realized. In general, hydraulic reactions involve calcium, silica, and alumina ingredients. Reaction products, when introduced to water, include calcium silicate and calcium aluminate hydrates. Any cementitious material that undergoes a hydraulic reaction with water, as defined above, may be used as the hydraulic binder material of the inventive synthetic aggregates.

In one embodiment of the present invention, Portland cement is used as a binder material. Portland cement is a type of hydraulic cement that typically includes calcium oxides, silica, and alumina in various proportions. Compositions of Portland cement may include CaO in a range of 61-67%, $SiO_2$ in a range of 19-23%, $Al_2O_3$ in a range of 2.5-6%, $Fe_2O_3$ in a range of 0-6% and sulfate in a range of 1.5-4.5%.

Various compositions of Portland cement are set forth in ASTM C150/C150M-16e1 "Standard Specification for Portland Cement", available from ASTM International, West Conshohocken, Pa., 2016, the disclosure of which is incorporated by reference herein. Any of these compositions may be used as the hydraulic binder of the present invention.

Another hydraulic binder that may be used in the synthetic aggregates of the present invention is fresh concrete waste. As used herein, the expression "fresh concrete waste" relates to concrete that is produced from, for example, Portland cement and various aggregates, and may be recovered from concrete production operations (e.g., concrete trucks, concrete mixing sites). To minimize the waste generation, the natural coarse and fine aggregates in the waste may first be reclaimed, with the slurry containing cement powder processed by a combination of sedimentation, dewatering by filter pressing and air-drying. However, this typically leaves some percentage of fine aggregates that are not cement in the fresh concrete waste.

Fresh concrete waste typically has not yet been formed into a final product. Fresh concrete waste may be 1-10% of concrete forming operations and has, in the past, been disposed of in landfills. Thus the use of fresh concrete waste in the synthetic aggregates of the present invention may result in an aggregate product that is completely fabricated from waste materials. As with the waste starting materials, the composition of the fresh concrete waste may also be variable but is typically the composition of concrete with a larger amount of silica due to remaining sediments in the waste, having as main components 30-50% CaO, 40-60% $SiO_2$ and 5 to 15% $Al_2O_3$.

In one embodiment, a binder material may be formed as a reaction product between water, an alkali additive, and the starting material. The starting material of ground granulated blast furnace slag includes substantial amounts of calcium oxide, silica, and aluminum oxide, making it susceptible to a hydraulic reaction with water. Using an activator such as an alkali creates further reaction products from the silica and the aluminum oxide that aid in the binding activity. The alkali used in this invention includes sodium hydroxide and liquid sodium silicate ("water glass"). The sodium hydroxide has a purity above 95% and is used in an amount of about 0.02 to 0.04 (mass ratio) of starting materials. An exemplary composition of sodium silicate is 8.6 ms % $Na_2O$, 28.3% ms $SiO_2$ and 63.1 ms % $H_2O$, used in an amount of about 0.15 (mass ratio) of the starting materials. Thus for the embodiment employing an alkali, the starting material may be above 99% ground granulated blast furnace slag with the binder essentially being formed in situ by a combination of a hydraulic reaction and the reaction with the activator alkali.

Pelletization

Pelletization or balling is the process of agglomerating particles together into larger, semi-permanent pellets. The pelletizing process is mainly controlled by the physio-chemical properties of the input powder and its process parameters. The synthetic aggregates of the present invention are typically formed into pellets through the use of a pelletizer. Any conventional pelletizer may be used and many pelletizers are commercially available. Disk pelletization may optionally be used as disk pelletization advantageously produces an approximately spherical product. Spherical products are favored for many applications such as aggregate for concrete. In disk pelletization, the mixed waste materials and optional binder materials are fed to the pelletizing disk. The fed materials are sprayed with water or water and alkali mixture. As the pelletizer is rotated, the wet starting materials form a small spherical pellet. The small pellets are grown by coalescence into larger pellets until they discharge from the pelletizer. Various discharge sizes may be selected to form pellets of the desired size. Depending on the application, a variety of sizes may be formed. In the working examples below, sizes of 5, 10, and 15 mm are formed but other sizes are contemplated for the present invention. Note that the pellets, as discharged from the pelletizer, are green pellets. These green pellets continue drying and hydraulic hardening over a period of several days to reach their final dry strength. The strength of the pellets in the working examples was measured approximately 7 days after pelletization and carbonation. Note that due to the hydraulic reaction, no high temperature firing or sintering is required to obtain strengths of equal to or greater than 0.5 MPa as seen in the working examples below.

The proportion of water added to the mixture may be from approximately 0.2 to 1 to approximately 0.4 to 1 for dry starting materials. If there is substantial moisture content in the starting materials, the water content may be reduced. In the embodiments of the working examples, the water content is 0.3 to 1. In one embodiment, a portion of the water may be substituted by hydrogen peroxide. Typically, the amount of hydrogen peroxide ranges from 5% to 30% of the amount of water. Through the addition of hydrogen peroxide, the density of the resultant aggregate may be reduced. This is because hydrogen peroxide increases the porosity of the aggregate formed. This may increase the thermal insulation properties of the aggregate as well as increasing sound insulation. The density of the aggregate may be reduced to less than or equal to approximately 1200 kg/m$^3$, more particularly less than or equal to 800 kg/m$^3$ and more particularly less than or equal to approximately 650 kg/m$^3$.

To reduce water absorption in the inventive synthetic aggregates, treatment with a water absorption reduction agent may be employed during pelletization. An example of a category of water absorption reduction agents that may be used is silicon compounds such as organic silicon compounds. An exemplary category of organic silicon compounds is alkoxysilanes. Exemplary alkoxysilanes include trialkoxysilanes. In particular, a trialkoxysilane such as isobutyltriethoxysilane may be dispersed in water or aqueous solvent and sprayed onto the agglomerating synthetic aggregate particles. The resulting surfaces become hydrophobic, resisting water absorption. Such organic silicon treatment is particularly useful for starting materials based on sewage sludge ash which tend towards higher water absorption than the starting materials of granulated ground blast furnace slag and recycled concrete fines.

Another technique to reduce water absorption of the inventive synthetic aggregates is to include fly ash, lime, kaolin and silica fume, in amounts from approximately 1% to approximately 10%. These materials may be mixed into the starting materials and binder or may be covered outside of the aggregates by feeding the materials onto the grown or nearly-grown pellets.

Carbonation

Carbonation may be performed during pelletization (in situ carbonation), after pelletization (post-pelletization carbonation), or both during and after pelletization. When performed during pelletization, an atmosphere including carbon dioxide in an amount of approximately 50% or more (volume percent) is introduced into the pelletizer. Ambient temperatures may be used or slightly elevated temperatures up to approximately 100° C. During carbonation, various ingredients in the starting waste and binder materials may react with the carbon dioxide to increase the strength of the resulting aggregate and also to decrease water absorption of the resulting aggregate. In particular, calcium carbonate and magnesium carbonate may be formed according to the following reactions:

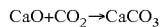  (1)

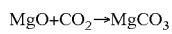  (2)

In addition to the carbonation reaction, carbon dioxide reduces the density of the synthetic aggregates by increasing the porosity of the formed pellets. Thus aggregates formed by in situ carbonation are typically lightweight synthetic aggregates having densities less than about 1200 kg/m$^3$, with some lower than 800 kg/m$^3$, and some lower than 650 kg/m$^3$. Depending upon the size of the pellets, in situ carbonation is performed for at least 30 minutes. For carbonation during pelletization, carbonate reaction products are distributed predominantly on the surface regions of the pellets.

Alternatively or additionally to carbonation during pelletization, carbonation may be performed after pelletization. Resulting aggregates may be higher density than those aggregates with carbonation during pelletization. Post-pelletization carbonation produced aggregates have densities ranging from about 1700 kg/m$^3$ to about 2000 kg/m$^3$. When performed after pelletization, carbonation treatment is performed in a carbon dioxide atmosphere of greater than 50% carbon dioxide (by volume) at ambient temperatures or slightly elevated temperatures up to approximately 100° C. Longer treatment times are used, typically treatment for greater than one hour for aggregate sizes of 5 mm or more. In one example below, treatment was performed for approximately three hours on aggregates having an average size of 10 mm. Longer treatment times yield a greater percentage of carbonates formed and more carbonates are formed in the inner regions of the pellets in addition to the surface regions.

Advantageously, the reaction products from carbonation may assist in immobilization of any heavy-metal contaminants in the starting materials.

EXAMPLES

Three starting materials were tested with the compositions being determined by x-ray fluorescence spectroscopy. The compositions are listed in the tables below. The median particle size, $D_{50}$, was 8.32 μm for granulated ground blast furnace slag, 618.44 μm for recycled concrete waste fines, and 44.21 μm for sewage sludge ash while the mean particle size was 11.88 μm for granulated ground blast furnace slag, 678.23 μm for recycled concrete waste fines, and 97.09 μm for sewage sludge ash.

TABLE 1

Ground Granulated Blast-Furnace Slag (GGBS)

| | ms % | mol % |
|---|---|---|
| MgO | 7.6308 | 11.5172 |
| $Al_2O_3$ | 14.4437 | 8.6187 |
| $SiO_2$ | 35.1439 | 35.5768 |
| $SO_4$ | 2.7674 | 1.7528 |
| $K_2O$ | 0.8360 | 0.5399 |
| CaO | 37.7146 | 40.9172 |
| $TiO_2$ | 0.6747 | 0.5138 |
| MnO | 0.5308 | 0.4553 |
| $Fe_2O_3$ | 0.2580 | 0.0983 |

TABLE 2

Recycled Concrete Waste Fines

| | ms % | mol % |
|---|---|---|
| MgO | 1.2487 | 1.9500 |
| $Al_2O_3$ | 8.3076 | 5.1292 |
| $SiO_2$ | 42.9202 | 44.9693 |
| $SO_4$ | 2.6820 | 1.7576 |
| $K_2O$ | 2.5620 | 1.7121 |
| CaO | 37.8932 | 42.5376 |
| $TiO_2$ | 0.4041 | 0.3184 |
| MnO | 0.1132 | 0.1005 |
| $Fe_2O_3$ | 3.8690 | 1.5253 |

TABLE 3

Sewage Sludge Ash (SSA)

| | ms % | mol % |
|---|---|---|
| $Na_2O$ | 5.2595 | 6.8295 |
| MgO | 3.7671 | 7.5209 |
| $Al_2O_3$ | 11.6452 | 9.1918 |

TABLE 3-continued

Sewage Sludge Ash (SSA)

|  | ms % | mol % |
|---|---|---|
| $SiO_2$ | 25.3387 | 33.9403 |
| $P_2O_5$ | 13.6432 | 7.7356 |
| $SO_4$ | 5.9614 | 4.9946 |
| $K_2O$ | 2.2492 | 1.9216 |
| CaO | 11.9305 | 17.1218 |
| $TiO_2$ | 0.4612 | 0.4646 |
| MnO | 0.2273 | 0.2578 |
| $Fe_2O_3$ | 19.1407 | 9.6465 |
| CuO | 0.1398 | 0.1414 |
| ZnO | 0.2362 | 0.2336 |

Compositions

A matrix of starting materials and binders or alkali reaction products were pelletized, carbonation cured and tested. Table 4 below lists 15 different compositions based on the three starting materials of ground granulated blast furnace slag (GGBS), recycled concrete waste fines (RCF), and sewage sludge ash (SSA) with binders of Ordinary Portland Cement having a composition of CaO 67%, $SiO_2$ 19.4%, $Al_2O_3$ 3.4%, $Fe_2O_3$ 3.5% and sulfate 5.1% or Fresh Concrete Waste consisting of 5% cement, 66.5% sand and 28.5% soil or, alternatively, reaction with alkali including sodium hydroxide and sodium silicate respectively in an amount of 0.02 and 0.15 of starting materials.

TABLE 4

Summary of different compositions of starting waste materials and binders for pelletizing.

|  | OPC | | FCW | | |
|---|---|---|---|---|---|
|  | 25% | 10% | 25% | 10% | Alkali |
| GGBS | I | IV | VII | X | XIII |
| RCF | II | V | VIII | XI | XIV |
| SSA | III | VI | IX | XII | XV |

Pelletization

A disc pelletizer is used to produce aggregates. The diameter of the disc is 0.5 m with the side depth of 0.25 m. The angle of the disc can be adjusted from 0 to 90°. The rotation speed of the pelletizer can be controlled between 10 rpm and 20 rpm. There are three preformed holes in the top cap, which can be optionally connected to a tank of $CO_2$ for $CO_2$ curing during the pelletization or connected to the water tank for auto-controlling of the water spraying. The raw materials can be loaded through the funnel fixed on the top cap.

A detailed study is carried out on the process of pelletization with different parameters such as the influence of the angle of the pelletizer, speed of revolution, and its process duration. Three different angles (50°, 60° and 70°) of pelletizer and three different speeds (10 rpm, 15 rpm and 20 rpm) of revolution were tried to maximize the manufacturing process efficiency. 60° and 15 rpm is recommended based on the test results.

Properties

The physical properties including bulk density and 24-h water absorption are determined according to BS EN 1097, according to equations (3) and (4):

$$\rho_{pellet} = \frac{M_{dry}}{M_{sat} - M_{imm}} \text{kg/m}^3 \quad (3)$$

$$WA_{24h} = \frac{M_{sat} - M_{dry}}{M_{dry}} \% \quad (4)$$

Where the oven-dry mass is $M_{dry}$, immersed mass is $M_{imm}$ and 24-h saturated surface dry mass is $M_{sat}$.

The crushing strength test procedure adopted in this project is based on a specific test for synthetic aggregates for use in concrete. The strength of an individual pellet (S) is determined by loading the pellet between two parallel plates and loading to fractures at $P_c$:

$$S = \frac{2.8P_c}{\pi X^2} \quad (5)$$

where X is the sphere diameter of an individual pellet. The mean strength for each batch of aggregated product is calculated based on average values of 5 individual pellets results.

The crushing strength is listed in Table 5 for 10 mm aggregate pellets of each of the 15 starting compositions set forth above. For these pellets, 0 hour, 3 hours and 6 hours post-pelletization carbonation were employed for each composition after pellets forming, and the strength was measured approximately 7 days after pelletization and carbonation, and their densities range from about 1700 kg/m³ to about 2000 kg/m³.

TABLE 5

Summary of crushing strength of 15 compositions exposed to three different carbonation curing conditions

| | Crushing strength (MPa) | | |
|---|---|---|---|
| Composition Number | 0 hour carbonation | 3 hours carbonation | 6 hours carbonation |
| I | 3.04 | 5.9 | 5.79 |
| II | 2.31 | 3.07 | 3.02 |
| III | 2.15 | 2.59 | 1.65 |
| IV | 2.91 | 4.16 | 4.98 |
| V | 1.42 | 1.54 | 1.51 |
| VI | 0.57 | 0.68 | 0.37 |
| VII | 0.91 | 1.93 | 1.03 |
| VIII | 0.20 | 0.25 | 0.23 |
| IX | 0.15 | 0.14 | 0.09 |
| X | 0.79 | 0.88 | 0.44 |
| XI | 0.10 | 0.16 | 0.15 |
| XII | 0.03 | 0.03 | 0.03 |
| XIII | 7.31 | 9.24 | 1.88 |
| XIV | 0.11 | 0.20 | 0.35 |
| XV | 0.09 | 0.1 | 0.07 |

As can be seen from the results listed in Table 5, carbonation curing significantly increases the crushing strength of most compositions, and the increase rate is higher for 3 hours carbonation curing. The strengths for compositions VIII, IX, XI, XII, XIV and XV were less than a target level of 0.5 MPa. Therefore, it is not recommended that these materials be used in concrete formation. However, they may be used in other civil engineering applications.

Lightweight aggregates produced from carbonation during pelletization were also formed and tested for two of the compositions listed in Table 4. A lightweight aggregate of composition I having a density of 1100 kg/m³, a water absorption of 16%, and a strength of 1.5 MPa was formed and a lightweight aggregate of composition III having a density of 900 kg/m³, a water absorption of 17%, and a strength of 0.9 MPa was formed. Both had strengths sufficient for use in concrete formation meaning that lightweight concrete products could be formed using these lightweight aggregates.

In order to identify the leachability of heavy metals from the aggregates, the toxicity characteristic leaching procedure (TCLP) test is conducted according to the US Environmental Protection Agency method. The broken aggregate samples with starting materials of ground granulated blast furnace slag and sewage sludge ash (<10 mm) are put into an extraction fluid and tumble for 18 h. The heavy-metal concentrations from leachates are determined using an atomic absorption spectrophotometer. The main leaching heavy metals measured are Ag, Ba, Cr, Pb, Se, As, Hg and Cd. It is found that the measured values of leaching heavy metals in both normal and lightweight aggregates produced herein are much lower than the EPA standard requirements.

FIG. 1 shows photographs of divided synthetic aggregates from granulated ground blast furnace slag, recycled concrete waste fines and sewage sludge ash with ordinary Portland cement (25%) as the binder. Post-pelletization carbonation was performed for various time periods. As can be seen from the photographs, porosity increases with increased carbonation times.

Figure 2:
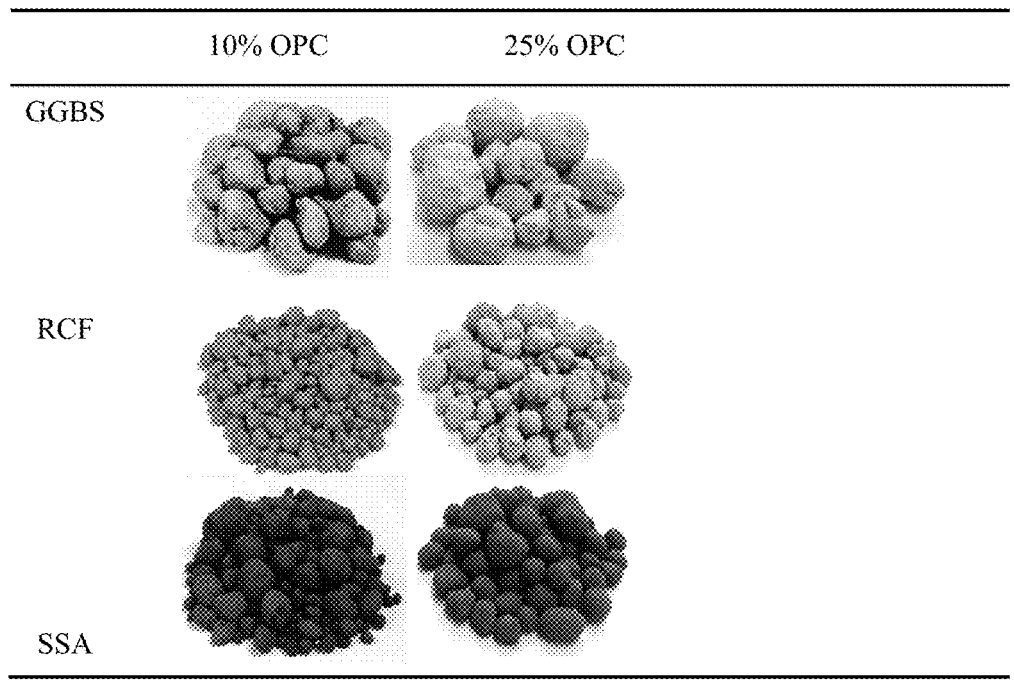
FIG. 2 shows photographs of undivided synthetic aggregates from granulated ground blast furnace slag, recycled concrete waste fines and sewage sludge ash with ordinary Portland cement (10% and 25%) as the binder. Post-pelletization carbonation was performed.

FIG. 2 shows photographs of undivided synthetic aggregates from granulated ground blast furnace slag, recycled concrete waste fines and sewage sludge ash with ordinary Portland cement (10% and 25%) as the binder. Post-pelletization carbonation was performed.

Figure 3:
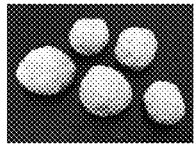
FIG. 3 shows photographs of divided and undivided lightweight synthetic aggregates with 75% wastes and 25% ordinary Portland cement binder with carbonation performed during pelletization.
Figure 3:
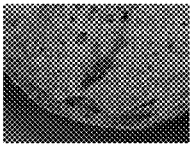
Figure 3:
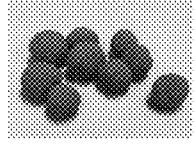
Figure 3:
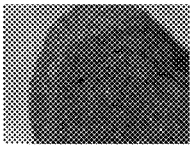

FIG. 3 shows photographs of divided and undivided lightweight synthetic aggregates with 75% wastes and 25% ordinary Portland cement binder with carbonation performed during pelletization. As compared to the normal weight synthetic aggregate of FIG. 1, increased porosity occurs for the lightweight synthetic aggregates due to the carbonation during pelletization.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the specification, and following claims.

The invention claimed is:

1. A synthetic aggregate fabricated from greater than approximately 70 wt % waste starting materials selected from granulated ground blast furnace slag, recycled concrete waste fines, or sewage sludge ash, and mixtures thereof, the starting materials being bound together by a hydraulic cementitious binder, the waste starting materials and binder having been formed into pellets and subjected to a hydraulic reaction and carbonation in an atmosphere of greater than approximately 50% carbon dioxide at temperatures less than approximately 100° C., the aggregate having a crush strength after a period of hardening equal to or greater than approximately 0.5 MPa wherein the carbonation occurs while the pellets are being formed and the density is less than about 1200 kg/m$^3$.

2. The synthetic aggregate of claim 1 wherein the waste starting material is sewage sludge ash in an amount greater than 75 wt %.

3. The synthetic aggregate of claim 1 further comprising an additional material selected from fly ash, lime, kaolin and silica fume.

4. The synthetic aggregate of claim 1 wherein the waste starting material is granulated ground blast furnace slag in an amount greater than 75%.

5. A concrete product including the synthetic aggregate of claim 1.

6. A synthetic aggregate fabricated from greater than approximately 70 wt % waste starting materials selected from granulated ground blast furnace slag, recycled concrete waste fines, or sewage sludge ash, and mixtures thereof, the starting materials being bound together by a hydraulic cementitious binder, the waste starting materials and binder having been formed into pellets and subjected to a hydraulic reaction and carbonation in an atmosphere of greater than approximately 50% carbon dioxide at temperatures less than approximately 100° C., the aggregate having a crush strength after a period of hardening equal to or greater than approximately 0.5 MPa wherein the carbonation occurs after the pellets are formed and the density is above about 1700 kg/m$^3$.

7. The synthetic aggregate of claim 6 wherein the waste starting material is sewage sludge ash in an amount greater than 75 wt %.

8. The synthetic aggregate of claim 6 further comprising an additional material selected from fly ash, lime, kaolin and silica fume.

9. The synthetic aggregate of claim 6 wherein the waste starting material is granulated ground blast furnace slag in an amount greater than 75%.

10. A concrete product including the synthetic aggregate of claim 6.

11. A synthetic aggregate fabricated from greater than approximately 70 wt % waste starting materials selected from granulated ground blast furnace slag, recycled concrete waste fines, or sewage sludge ash, and mixtures thereof, the starting materials being bound together by a hydraulic cementitious binder, the waste starting materials and binder having been formed into pellets and subjected to a hydraulic reaction and carbonation in an atmosphere of greater than approximately 50% carbon dioxide at temperatures less than approximately 100° C., the aggregate having a crush strength after a period of hardening equal to or greater than approximately 0.5 MPa wherein the aggregate is fabricated from the waste starting materials, binder, water and hydrogen peroxide and the density is less than 1200 kg/m$^3$.

12. The synthetic aggregate of claim 11 wherein the waste starting material is sewage sludge ash in an amount greater than 75 wt %.

13. The synthetic aggregate of claim 11 further comprising an additional material selected from fly ash, lime, kaolin and silica fume.

14. The synthetic aggregate of claim 11 wherein the waste starting material is granulated ground blast furnace slag in an amount greater than 75%.

15. A concrete product including the synthetic aggregate of claim 11.

16. A synthetic aggregate fabricated from greater than approximately 70 wt % waste starting materials selected from sewage sludge ash, the starting materials being bound together by a hydraulic cementitious binder, the waste starting materials and binder having been formed into pellets and subjected to a hydraulic reaction and carbonation in an atmosphere of greater than approximately 50% carbon dioxide at temperatures less than approximately 100° C., the aggregate having a crush strength after a period of hardening equal to or greater than approximately 0.5 MPa and wherein the water absorption is less than approximately 20% and the pellets are treated with a silane-based agent.

17. The synthetic aggregate of claim 16 wherein the waste starting material is present in an amount greater than 75 wt %.

18. The synthetic aggregate of claim 16 further comprising an additional material selected from fly ash, lime, kaolin and silica fume.

19. A concrete product including the synthetic aggregate of claim 16.

* * * * *